Aug. 8, 1933.  R. O. CROWELL  1,921,384
WIRE STRIPPING APPARATUS
Filed Sept. 30, 1931
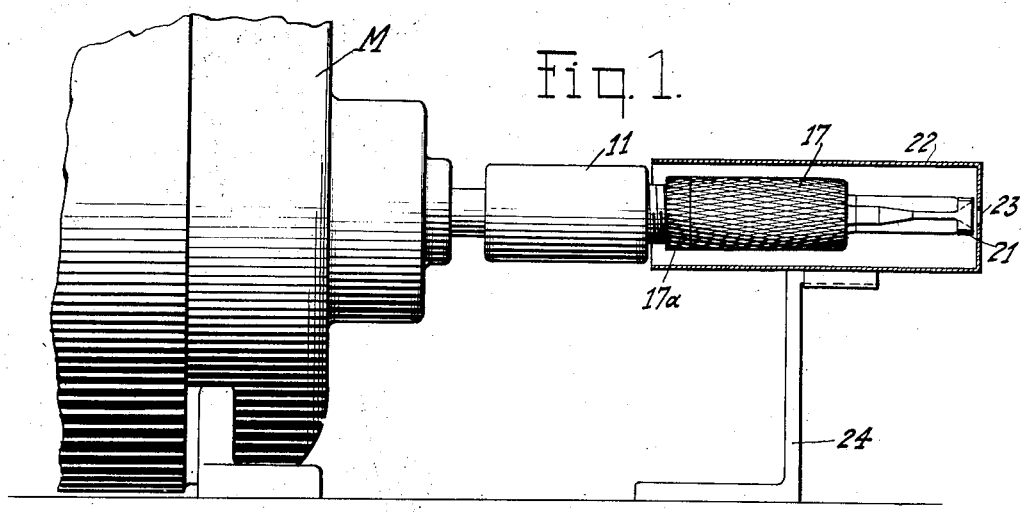
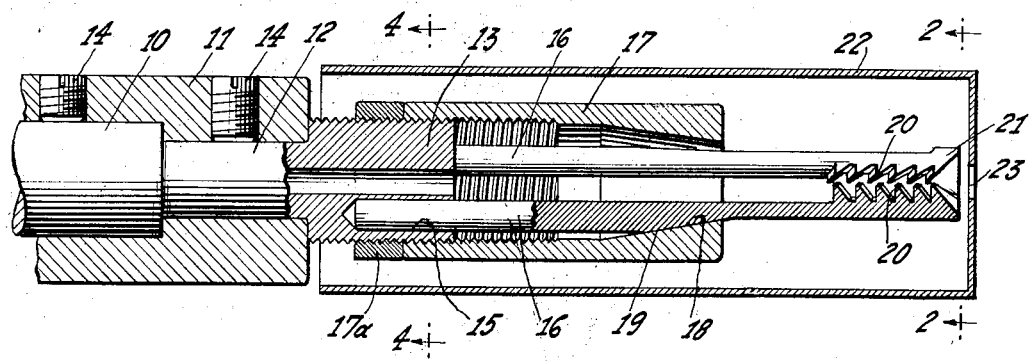
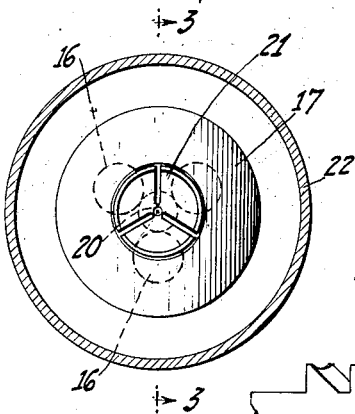
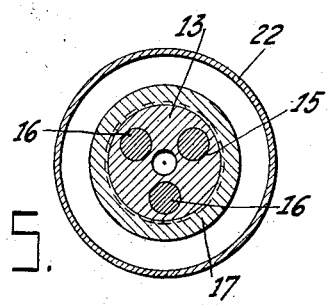
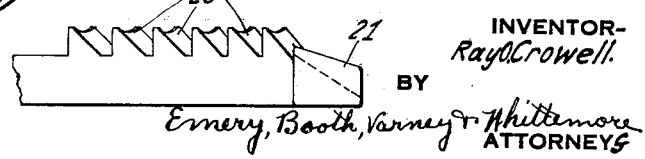
INVENTOR-
Ray O. Crowell.
BY
Emery, Booth, Varney & Whittemore
ATTORNEYS Patented Aug. 8, 1933

1,921,384

UNITED STATES PATENT OFFICE 1,921,384

WIRE STRIPPING APPARATUS

Ray O. Crowell, Rome, N. Y., assignor to General Cable Corporation, New York, N. Y., a Corporation of New Jersey Application September 30, 1931
Serial No. 565,997

5 Claims. (Cl. 81—9.51)

This invention relates to wire stripping apparatus and has for an object the provision of novel and improved apparatus especially adapted for stripping insulation from electrical conductors. The present embodiment of the invention was developed especially for removing thin hard coatings such as enamel from wires, so the invention will be described with this application in mind, though without intention of imposing any restrictions upon the scope of the invention.

In the accompanying drawing which illustrates the exemplary embodiment:

Fig. 1 is a side elevation of the apparatus in assembly;

Fig. 2 is a section taken on the line 2—2 of Fig. 3;

Fig. 3 is a longitudinal section taken on the line 3—3 of Fig. 2;

Fig. 4 is a section taken on the line 4—4 of Fig. 3, and

Fig. 5 is a side elevation of a single stripper member.

The stripper is adapted to be placed at some convenient location and to be operated as required, either by power or by hand. In the present embodiment power operation is selected, the power being supplied by an electric motor M which by suitable controls may be started and stopped at will. The stripper is relatively small and simple—much on the order of a common tool—and may readily be attached to the shaft 10 of the motor by a coupling sleeve 11. The sleeve has bores at its ends adapted to fit the shaft 10 and the shank 12 of a tool holder 13 respectively and is secured thereto by set screws 14.

The holder 13 is provided with an annular series of recesses or sockets 15 into which are inserted the stems of cutter members 16. The cutter members are retained by an adjusting sleeve 17 which is threaded upon the holder 13 and is tapered at 18 to cooperate with the tapered surfaces 19 formed on the backs of the members 16 to adjust the blades 20 on said members 16 radially. The holder and sleeve in effect constitute a chuck. A lock nut 17a holds the sleeve 17 in adjusted positions.

Interiorly the cutter members are provided with blades 20 set at an angle to the longitudinal axis and hollow ground circumferentially, i. e., transversely of the several individual blades, to fit the size of wire which is to be cleaned. A smoother action is produced without marring the wire by having the blades concave than otherwise. The angular disposition of the blades also contributes toward this beneficial action and besides tends to pull the insulation longitudinally of the wire, the easier to remove it, and to feed the wire longitudinally.

For different sizes of wire different cutting members are preferably used, though the ends of the cutting members which carry the blades are long and flexible and will spread, and the sleeve is adjustable to take care of some variations in size. The rotating blades, being arranged in series with their top surfaces disposed one behind the other in line along a common axis tend to straighten the wire as they clean it.

The outer ends 21 of the cutting members are extended circumferentially and flared interiorly to assist the movement of the ends of the wire toward the cutting blades. A cylindrical guard 22 provided with an end opening 23 for the wire is disposed around the stripping device. The guard is supported by a fixed bracket 24.

In operation, the cutting members are adjusted for the size of wire to be cleaned and the motor is started. When the cutting members are thus rotated the end of a length of wire to be cleaned is introduced into the flared opening formed by the ends of the cutting members. As the wire enters along the axis of rotation between the cutting members it is held by hand or otherwise to resist the inward pull of the inclined cutting blades so that the blades will strip the covering therefrom. In other words, the wire is fed in much more slowly than it would be fed if the inclined cutting blades acted simply as screw threads to pull the wire in. Either a short end of the wire may be stripped or the whole length may be stripped. In the first case the wire is pulled back when the desired length has been stripped. In the second case the entire length of wire moves in one direction through the machine. In the latter case the motor shaft must, of course, be hollow for its full length.

While one embodiment of the invention has been described in detail for purposes of illustration, it is to be understood that various modifications and changes may be made within the scope of the subjoined claims.

What I claim is:

1. Apparatus for stripping wire, comprising in combination, a rotatable chuck, cutting members secured therein and provided with flexible protruding ends, transversely inclined blades on said members, said blades being hollow ground to form longitudinal wire-receiving grooves, and laterally extended, internally flared ends on said cutting members for directing the wire between said blades.

2. Apparatus for stripping wire, comprising in combination, a rotatable head, cutting members in said head, axially inclined circumferentially concave stripping blades formed on each of said members, means to rotate said members at high speed whereby the stripping blades will exert a pulling action upon the covering of a wire presented thereto and means to adjust the members relative to the axis of rotation of said head.

3. Apparatus for stripping wire, comprising in combination, a rotatable head, stripping members secured therein and arranged around the axis of rotation, a plurality of transversely inclined blades on each of said members arranged in succession along the axis, and means acting upon said members for adjusting the size of opening formed along the axis between the blades.

4. Apparatus for stripping wire, comprising in combination, a rotatable head, stripping members secured therein and arranged around the axis of rotation, a plurality of transversely inclined concave blades on each of said members arranged in succession along the axis, and means acting upon said members for adjusting the size of opening formed along the axis between the blades.

5. Apparatus for stripping wire, comprising in combination, a rotatable head, stripping members secured therein and arranged around the axis of rotation, a plurality of transversely inclined blades on each of said members arranged in succession along the axis, said members being flared on their ends for directing the wire between the blades, and means acting upon said members for adjusting the size of opening formed along the axis between the blades.

RAY O. CROWELL.